United States Patent
Arai

(10) Patent No.: US 10,764,139 B2
(45) Date of Patent: Sep. 1, 2020

(54) INFORMATION PROCESSING SYSTEM AND REPORT CREATION METHOD

(71) Applicant: Shohei Arai, Kanagawa (JP)

(72) Inventor: Shohei Arai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 165 days.

(21) Appl. No.: 15/714,026

(22) Filed: Sep. 25, 2017

(65) Prior Publication Data

US 2018/0091370 A1 Mar. 29, 2018

(30) Foreign Application Priority Data

Sep. 29, 2016 (JP) ................. 2016-192221

(51) Int. Cl.
*H04L 12/24* (2006.01)
*G06F 3/12* (2006.01)
*H04L 12/26* (2006.01)

(52) U.S. Cl.
CPC ........ *H04L 41/0856* (2013.01); *G06F 3/1203* (2013.01); *G06F 3/1273* (2013.01);
(Continued)

(58) Field of Classification Search
CPC ... H04L 41/0856; H04L 43/04; H04L 43/065; H04L 43/0876; H04L 41/0213;
(Continued)

(56) References Cited

U.S. PATENT DOCUMENTS

2002/0026339 A1* 2/2002 Frankland ............... C10G 65/04
705/7.12
2002/0198798 A1* 12/2002 Ludwig .................. G06Q 10/06
705/35

(Continued)

FOREIGN PATENT DOCUMENTS

JP 2005-216123 8/2005
JP 2006-323447 11/2006
(Continued)

OTHER PUBLICATIONS

U.S. Appl. No. 15/604,895, filed May 25, 2017.
(Continued)

*Primary Examiner* — Benjamin M Thieu
(74) *Attorney, Agent, or Firm* — IPUSA, PLLC

(57) ABSTRACT

An information processing system stores operation history information of an output apparatus; stores settings of one or more types of reports available to each of customers; displays, on a terminal apparatus that is operated by a customer, one or more types of reports available to the customer on the basis of the stored settings of one or more types of reports available to each of the customers, to receive a selection of a type of a report from the customer from among the displayed one or more types of reports; and generates a report of the type selected by the customer concerning an operation history of an output apparatus that is used by the customer with the use of stored operation history information of the output apparatus, to display the generated report on the terminal apparatus.

18 Claims, 16 Drawing Sheets

(52) U.S. Cl.
CPC ............ *G06F 3/1285* (2013.01); *H04L 43/04* (2013.01); *H04L 43/065* (2013.01); *H04L 43/0876* (2013.01); *H04L 41/0213* (2013.01); *H04L 41/22* (2013.01)

(58) Field of Classification Search
CPC .... H04L 41/22; G06F 11/3065; G06F 3/1203; G06F 3/1273; G06F 3/1285
See application file for complete search history.

(56) References Cited

U.S. PATENT DOCUMENTS

| | | | | |
|---|---|---|---|---|
| 2003/0133556 | A1* | 7/2003 | Naik | H04L 41/082 379/201.12 |
| 2003/0135382 | A1* | 7/2003 | Marejka | G06F 11/0709 709/232 |
| 2003/0226059 | A1* | 12/2003 | Braun | G06F 11/0748 714/20 |
| 2006/0031094 | A1* | 2/2006 | Cohen | G16H 20/10 705/2 |
| 2006/0223495 | A1* | 10/2006 | Cassett | H04L 43/026 455/405 |
| 2007/0094055 | A1* | 4/2007 | Nakayama | E02F 9/2054 705/5 |
| 2008/0043256 | A1* | 2/2008 | Broda | G06F 17/211 358/1.3 |
| 2010/0125657 | A1* | 5/2010 | Dowling | G06F 11/3051 709/224 |
| 2011/0061015 | A1* | 3/2011 | Drees | G05B 15/02 715/771 |
| 2012/0022700 | A1* | 1/2012 | Drees | G05B 15/02 700/276 |
| 2012/0047225 | A1* | 2/2012 | Kunitake | G06Q 10/10 709/217 |
| 2012/0101952 | A1* | 4/2012 | Raleigh | G06Q 30/016 705/304 |
| 2012/0259583 | A1* | 10/2012 | Noboa | G05B 15/02 702/179 |
| 2013/0035108 | A1* | 2/2013 | Joslyn | H04W 24/08 455/454 |
| 2013/0087339 | A1* | 4/2013 | Foody | E21B 43/16 166/305.1 |
| 2013/0138948 | A1* | 5/2013 | Solotorevsky | H04L 12/1403 713/153 |
| 2014/0040462 | A1 | 2/2014 | Harada | |
| 2015/0302429 | A1* | 10/2015 | Mehra | G06Q 30/0201 705/7.29 |
| 2016/0006861 | A1* | 1/2016 | Hodges | H04M 1/72577 455/405 |
| 2017/0045932 | A1* | 2/2017 | Bostick | G06F 1/3296 |
| 2018/0077609 | A1* | 3/2018 | Lauer | H04L 43/0882 |
| 2018/0156695 | A1* | 6/2018 | Yokochi | G01M 99/00 |

FOREIGN PATENT DOCUMENTS

| | | |
|---|---|---|
| JP | 2014-032627 | 2/2014 |
| JP | 2015-130123 | 7/2015 |

OTHER PUBLICATIONS

U.S. Appl. No. 15/647,573, filed Jul. 12, 2017.
Office Action dated Jun. 2, 2020 issued with respect to the corresponding Japanese Patent Application No. 2016-192221.

* cited by examiner

FIG.5A

SALES COMPANY TABLE

| SALES COMPANY NAME | CUSTOMER COMPANY LIST |
|---|---|
| Service Provider1 | AA, BB, DD |
| Service Provider2 | CC, EE |
| ... | ... |

FIG.5B

CUSTOMER COMPANY TABLE

| CUSTOMER COMPANY NAME | AVAILABLE REPORTS | MONTHLY DATA CREATION REFERENCE DATE | APPARATUS LIST |
|---|---|---|---|
| AA | Usage Report, Environmental Information Report | 31 | Device1, Device2 |
| BB | Usage Report, Environmental Information Report, Report C | 25 | Device3, Device4 |
| ... | ... | ... | ... |

FIG.8

| Reporting Portal | | | Japanese ▽ | |
|---|---|---|---|---|
| CompanyListForGrouping TabApp × | | | | |
| Report Setting | Customer Company Configuration Editing | Customer Company | Regional Headquarter | Sales Company |
| | ✎ | CustomerCompanyName... | Regional Headquarter2 | InternalCompanyName_9 |
| | ✎ | CustomerCompanyName... | Regional Headquarter2 | InternalCompanyName_10 |
| | ✎ | CustomerCompanyName... | Regional Headquarter2 | InternalCompanyName_11 |
| 1001 | ✎ | CustomerCompanyName... | Regional Headquarter2 | InternalCompanyName_12 |
| | ✎ | CustomerCompanyName... | Regional Headquarter2 | InternalCompanyName_13 |
| | ✎ | CustomerCompanyName... | Regional Headquarter2 | InternalCompanyName_14 |
| | ✎ | CustomerCompanyName... | Regional Headquarter2 | InternalCompanyName_15 |
| | ✎ | | | InternalCompanyName_16 |

Customer Company List

Maintenance

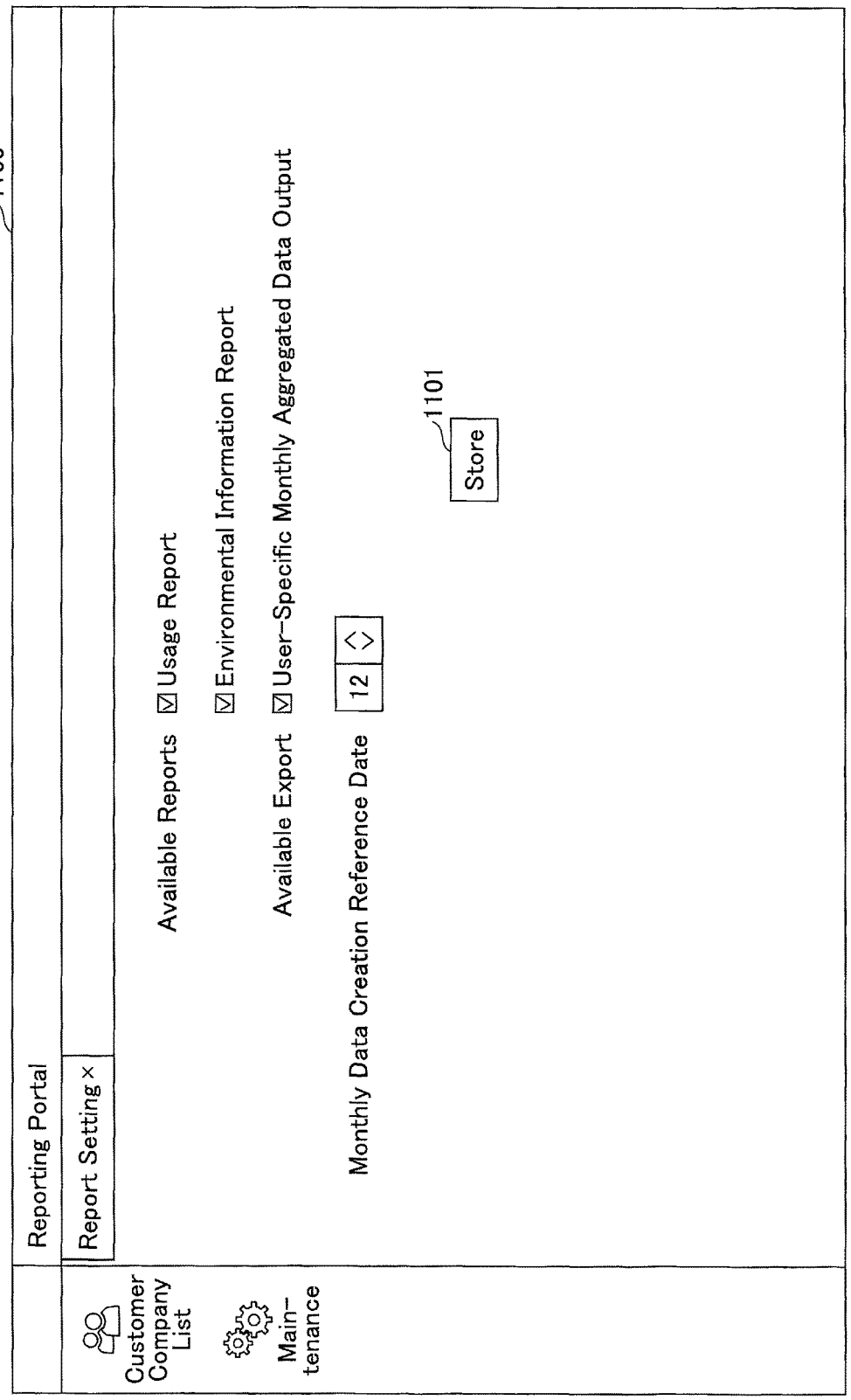

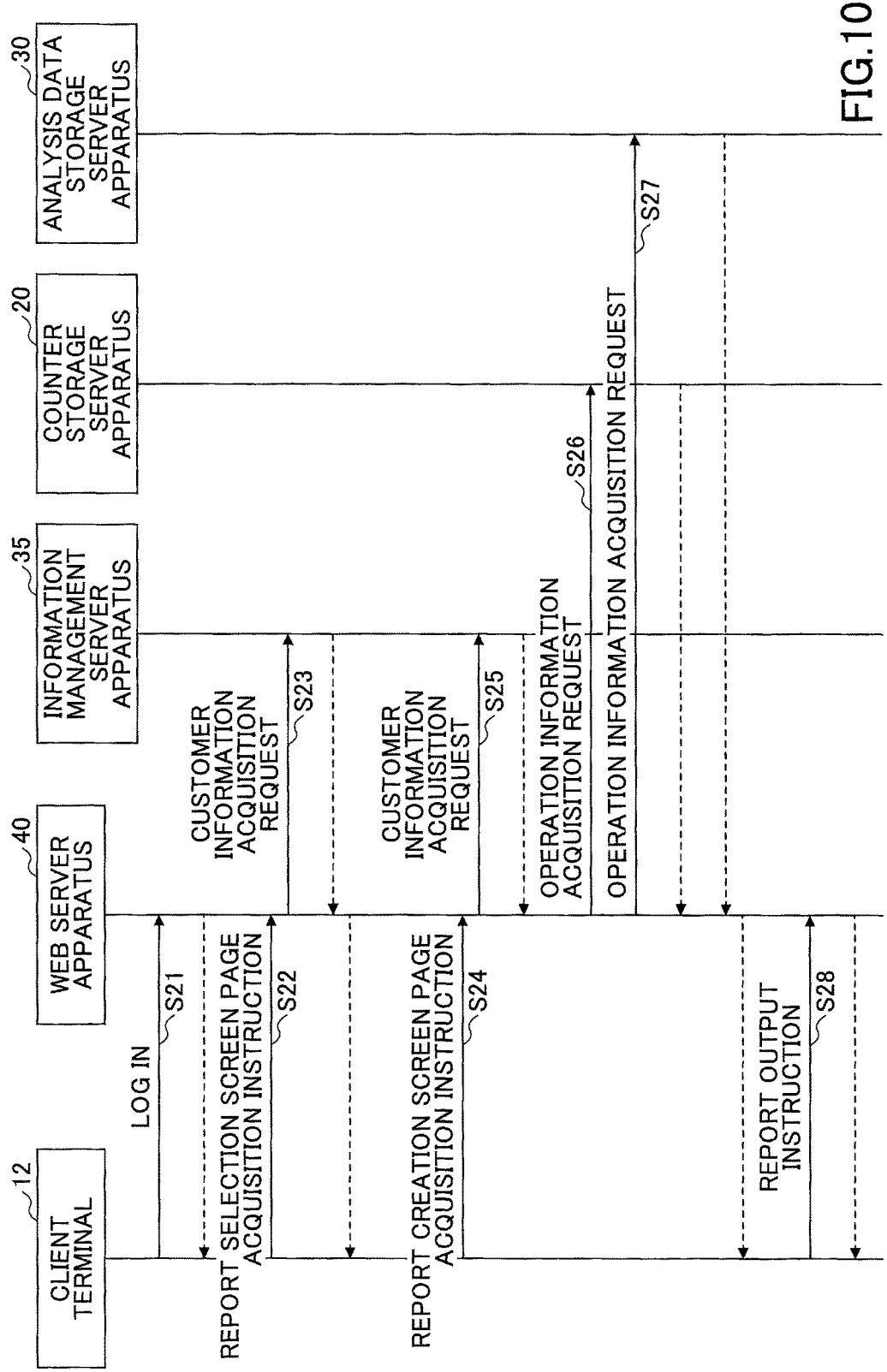

FIG.12A

Reporting Portal

Home × Usage Report ✕

- Home
- Report
- Data Output
- Setting — 1302

☐ Select Year and Month ▸
June, 2016 ▸
☐ Select Apparatus Group or Apparatus
All Apparatuses ☐ Select Item Number of Total Output Pages (For Each Color)
☑ Display Graph  ☑ Display Table Number of Total Output Pages (For Each Function)
☑ Display Graph  ☑ Display Table Number of Two-Sided Output Pages/Two-Sided Output Utilization Rate
☑ Display Graph  ☑ Display Table ☐ Report Detail Setting ▸

Japanese ▸

1300

1303

1301

[1] /18

Japanese  ⤴  ?▾

FIG.12B

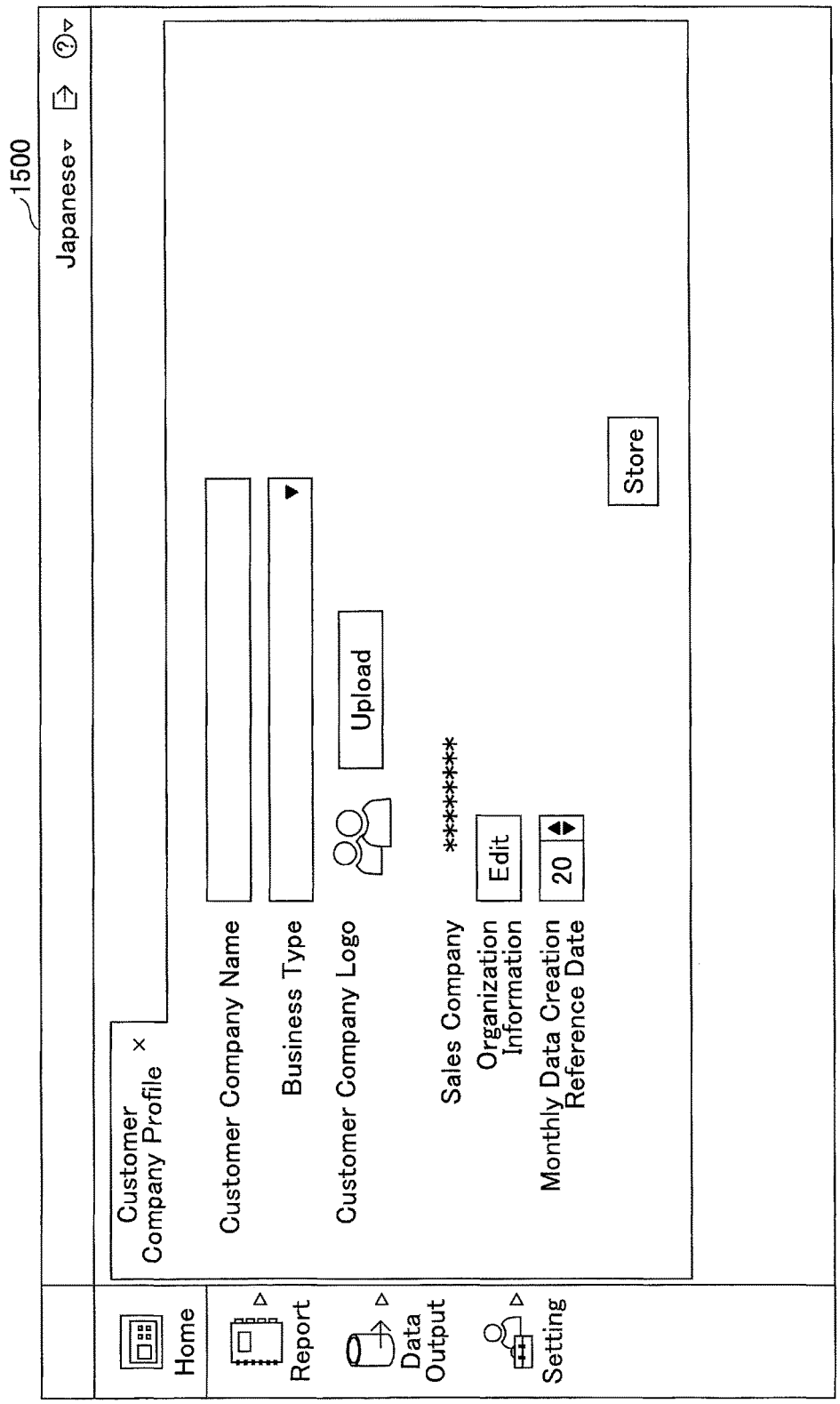

FIG.15A

SALES COMPANY TABLE

| SALES COMPANY NAME | CUSTOMER COMPANY LIST | AVAILABLE REPORTS |
|---|---|---|
| Service Provider1 | AA, BB, DD | Usage Report, Environmental Information Report, Report C |
| Service Provider2 | CC, EE | Report D, Report F |
| ... | ... | ... |

FIG.15B

CUSTOMER COMPANY TABLE

| CUSTOMER COMPANY NAME | AVAILABLE REPORTS | MONTHLY DATA CREATION REFERENCE DATE | APPARATUS LIST | BUSINESS TYPE |
|---|---|---|---|---|
| AA | Usage Report, Environmental Information Report | 31 | Device1, Device2 | X |
| BB | Usage Report, Environmental Information Report, Report C | 25 | Device3, Device4 | Y |
| ... | ... | ... | ... | ... |

INFORMATION PROCESSING SYSTEM AND REPORT CREATION METHOD

CROSS-REFERENCE TO APPLICATIONS

The present application claims priority under 35 U.S.C. § 119 to Japanese Patent Application No. 2016-192221, filed Sep. 29, 2016. The contents of Japanese Patent Application No. 2016-192221 is incorporated herein by reference in their entirety.

BACKGROUND

1. Technical Field

The present invention relates to an information processing system and a report creation method.

2. Description of the Related Art

An information processing system for acquiring information from an image processing apparatus installed in a customer environment, creating a report concerning the image processing apparatus such as a report of power consumption, a $CO_2$ emission amount, or the like, and outputting the report has been known.

For example, an apparatus management system for managing various apparatuses connected via a network has been known. In such an apparatus management system, information acquired from the various apparatuses via the network is managed, and reports are created from the acquired information (for example, see Japanese Unexamined Patent Application Publication No. 2014-32627).

SUMMARY

According to one aspect, an information processing system provides a report concerning an operation history of an output apparatus to a customer who uses the output apparatus. The information processing system has one or more processors and one or more memories. The one or more processors are configured to store, in the one or more memories, operation history information of each of output apparatuses; store, in the one or more memories, settings of one or more types of reports available to each of customers; display, on a terminal apparatus that is operated by a customer, one or more types of reports available to the customer on basis of the stored settings of one or more types of reports available to each of the customers, to receive a selection of a type of a report from the customer from among the displayed one or more types of reports; and generate a report of the type selected by the customer concerning an operation history of an output apparatus that is used by the customer with the use of stored operation history information of the output apparatus, to display the generated report on the terminal apparatus.

Other objects, features, and advantages will become more apparent from the following detailed description when read in conjunction with the accompanying drawings.

BRIEF DESCRIPTION OF THE DRAWINGS

FIG. 5A illustrates one example of a sales company table that stores sales company information managed by the information management server apparatus;

FIG. 5B illustrates one example of a customer company table that stores customer company information managed by the information management server apparatus;

FIG. 8 illustrates one example of a customer company selection screen page;

FIG. 9 illustrates one example of a customer information setting screen page;

FIG. 10 is a sequence diagram illustrating a report creation process;

FIGS. 12A and 12B illustrate one example of a report creation screen page;

FIG. 14 illustrates one example of the customer company profile setting screen page;

FIG. 15A illustrates another example of the sales company table; and

FIG. 15B illustrates another example of the customer company table.

DETAILED DESCRIPTION OF EMBODIMENTS

In a case where a report concerning an information processing apparatus installed in a customer environment is created by an apparatus management system, a customer's desired type of report may vary depending on the country, the region, the business type, the business model, and so forth of the customer. Therefore, it is desirable for the information processing system to be able to generate various types of reports in response to customers' requests. Also, it is desirable for the information processing system to allow a person who provides a report creation service to set types of reports available for each customer.

Embodiments of the present invention have an object to provide an information processing system in which it is possible to set available types of reports for each customer.

The embodiments of the present invention will now be described with reference to the drawings.

First Embodiment

<System Configuration>

Figure 1:
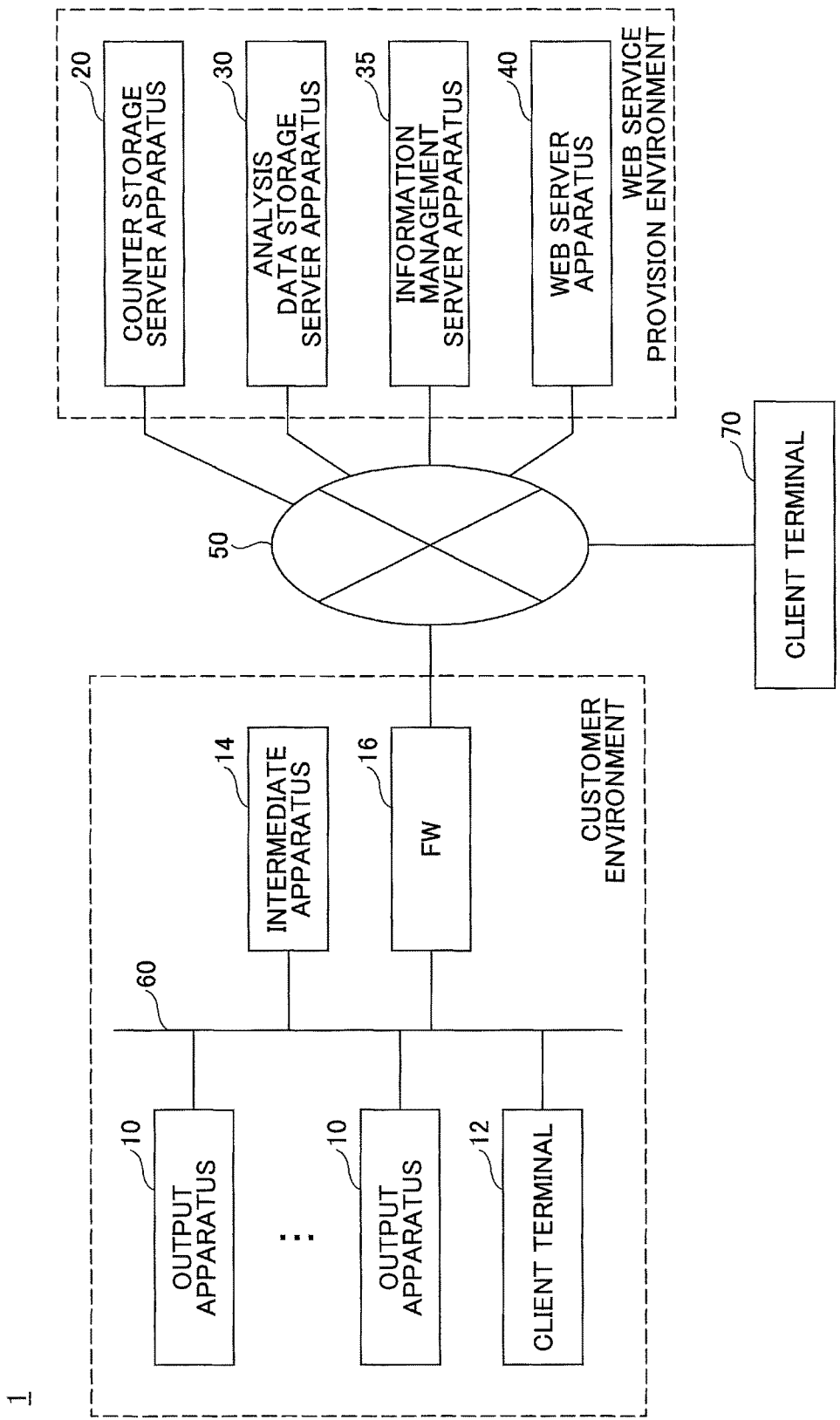
FIG. 1 illustrates one example of a configuration of an information processing system according to a first embodiment.

FIG. 1 illustrates one example of a configuration of an information processing system 1 according to a first embodiment. In the information processing system 1 of FIG. 1, a customer environment and a web service provision environment are connected together via a network 50 such as the Internet. In the information processing system 1, a customer in the customer environment receives a service provided by the web service provision environment, and may be a company, a group, an education agency, a division of an administration agency, or the like. In the customer environment, one or more output apparatuses 10, a client terminal 12, an intermediate apparatus 14, and a fire wall 16 are connected via a network 60 such as a LAN (Local Area Network). In the web service provision environment, a counter storage server apparatus 20, an analysis data storage server apparatus 30, an information management server apparatus 35, and a web server apparatus 40 are connected to the network 50. Further, in FIG. 1, a client terminal 70 that is operated by a user of a sales company is connected to the network 50. The sales company is one example of a company which provides a service to the customer.

The output apparatuses 10 may include image forming apparatuses such as laser printers, multifunction peripherals (or multifunction printers) or the like, projectors, electronic blackboards, TV conference apparatuses, cameras, industrial or home-use apparatuses having communications functions, medical apparatuses having communications functions, or the like. The output apparatuses 10 are examples of apparatuses to be managed. Each of the output apparatuses 10 holds operation history information (i.e., counter values).

The client terminal 12 is an information processing apparatus used by a user belonging to the customer such as a smartphone, a cellular phone, a tablet PC (Personal Computer), a desktop PC, a notebook PC, or the like. In the client terminal 12, an application such as a web browser having a screen page displaying function to display various screen pages is installed. As long as the application has the screen page displaying function to display various screen pages each including data received from the web server apparatus 40, the application is not limited to a web browser.

The intermediate apparatus 14 collects counter values from the output apparatuses 10, and transmits the collected counter values, together at a time, to the counter storage server apparatus 20. The output apparatuses 10 may transmit the respective counter values to the counter storage server apparatus 20 directly without using the intermediate apparatus 14. One example of the information processing system 1 does not include the intermediate apparatus 14.

The counter storage server apparatus 20 stores the counter values of the output apparatuses 10, received from the customer environment, in a form of an OLTP (Online Transaction Process) table. For example, the OLTP table stores daily data of the counter values of the output apparatuses 10. The analysis data storage server apparatus 30 uses the OLTP table of the counter storage server apparatus 20, to create an OLAP (Online Analysis Process) cube. For example, the OLAP cube stores monthly data generated from the daily data stored in the OLTP table on the basis of a cutoff date (or a reference date).

The information management server apparatus 35 manages sales company information and customer company information that will be described later. The web server apparatus 40 acquires the daily data and the monthly data of the output apparatuses 10 from the OLTP table of the counter storage server apparatus 20 and the OLAP cube of the analysis data storage server apparatus 30. Also, the web server apparatus 40 acquires the sales company information and the customer company information from the information management server apparatus 35.

The web server apparatus 40 creates reports on the basis of the thus acquired daily data, monthly data, sales company information, and customer company information, creates screen page data used to display the reports on the client terminal 12, and transmits the screen page data to the client terminal 12.

The client terminal 70 is an information processing apparatus used by a user belonging to the sales company such as a smartphone, a cellular phone, a tablet PC, a desktop PC, a notebook PC, or the like. In the client terminal 70, an application such as a web browser having a screen page displaying function to display various screen pages is installed.

The configuration of the information processing system 1 illustrated in FIG. 1 is one example, and one or more other sever apparatuses such as a proxy server, a gateway server, and so forth may be inserted between the customer environment and the counter storage server apparatus 20. Also, it is possible that the client terminal 12 is not located in the customer environment. For example, the client terminal 12 may be connected to the network 50 directly. The counter storage server apparatus 20, the analysis data storage server apparatus 30, the information management server apparatus 35, and the web server apparatus 40 of FIG. 1 may be integrated into and implemented by a single information processing apparatus, or may be distributed to and implemented by a plurality of information processing apparatuses.

For example, some or all of the functions of the counter storage server apparatus 20 may be implemented by the analysis data storage server apparatus 30, the information management server apparatus 35, the web server apparatus 40, or another server apparatus. Some or all of the functions of the analysis data storage server apparatus 30 may be implemented by the counter storage server apparatus 20, the information management server apparatus 35, the web server apparatus 40, or another server apparatus. Some or all of the functions of the information management server apparatus 35 may be implemented by the counter storage server apparatus 20, the analysis data storage server apparatus 30, the web server apparatus 40, or another server apparatus. Some or all of the functions of the web server apparatus 40 may be implemented by the counter storage server apparatus 20, the analysis data storage server apparatus 30, the information management server apparatus 35, or another server apparatus.

According to the information processing system 1 of the first embodiment having the above-described configuration, daily data of the output apparatuses 10 are collected to the counter storage server apparatus 20. The analysis data storage server apparatus 30 acquires the daily data from the counter storage server apparatus 20, to create monthly data for each group or each of the output apparatuses 10.

Then, the web server apparatus 40 creates a web page that includes the monthly data for each group or each of the output apparatuses 10, and displays the web page on the client terminal 12 or the client terminal 70 with the web browser. The web server apparatus 40 also creates a web page that includes a usage report, an environmental information report, or the like for each group or each of the output apparatuses 10, and displays the web page on the client terminal 12 or the client terminal 70 with the web browser.

<Hardware Configuration>

《Computed》

Figure 2:
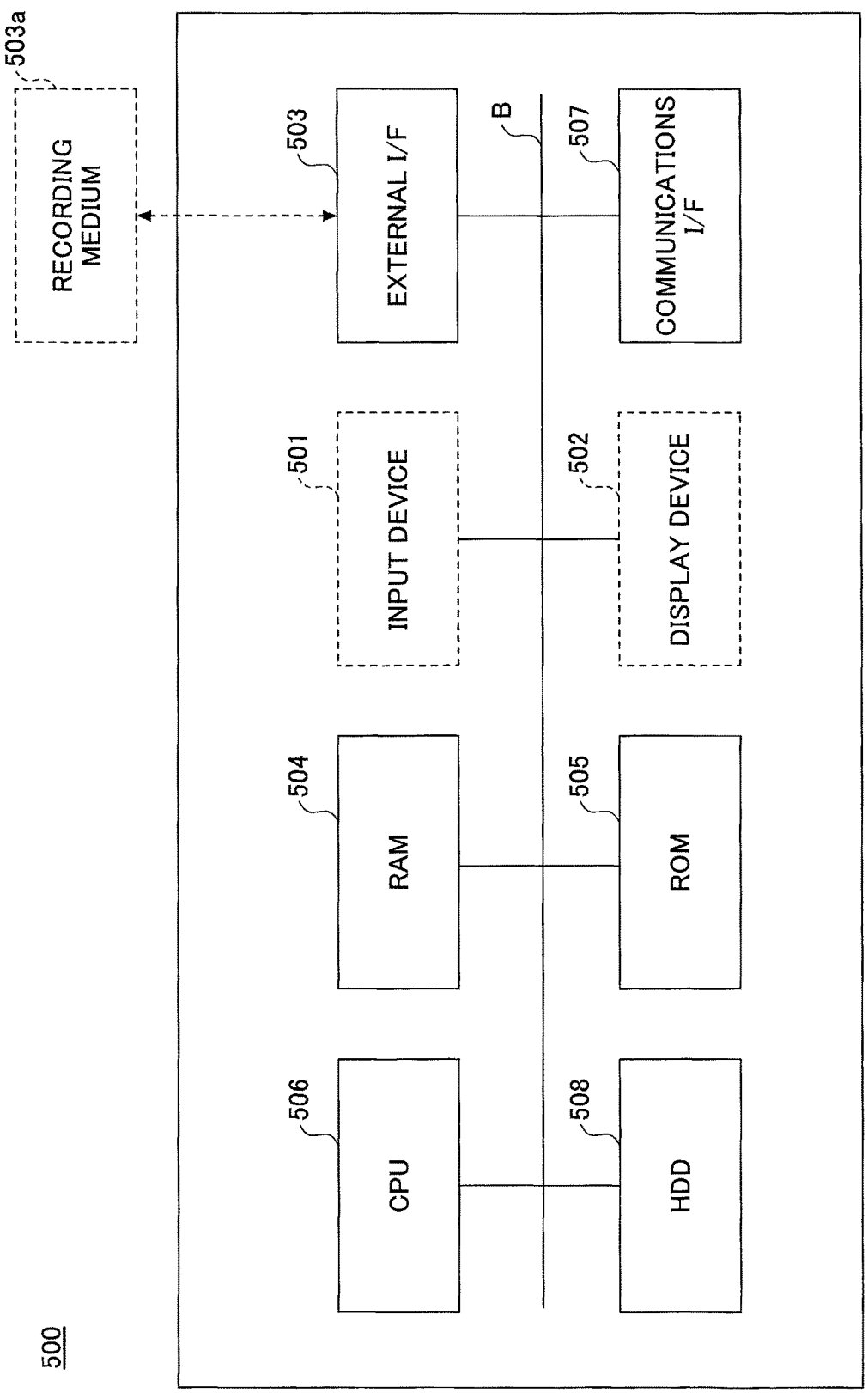
FIG. 2 illustrates a hardware configuration of a computer.

Each of the client terminals 12 and 70 is implemented by, for example, a computer having a hardware configuration illustrated in FIG. 2. Also, the one or more information processing apparatuses implementing the counter storage server apparatus 20, the analysis data storage server apparatus 30, the information management server apparatus 35, and the web server apparatus 40 are implemented by one or more computers each having the hardware configuration illustrated in FIG. 2.

FIG. 2 illustrates a hardware configuration of a computer. The computer of FIG. 2 includes an input device 501, a display device 502, an external I/F (InterFace) 503, a RAM (Random Access Memory) 504, a ROM (Read-Only Memory) 505, a CPU (Central Processing Unit) 506, a communications I/F 507, and a HDD (Hard Disk Drive) 508, which are mutually connected via a bus B. Note that the input device 501 and the display device 502 may be detachable from the computer body.

The input device 501 includes a keyboard, a mouse, a touch panel, or the like, and is used for a user to input various operation signals. The display device 502 includes a display screen, and so forth, and displays processing results of the computer 500.

The communications I/F 507 connects the computer 500 to various networks. The computer 500 carries out data communications using the communications I/F 507.

The HDD 508 is one example of a nonvolatile storage device storing programs and data. The programs and the data stored in the HDD 508 include an OS (Operating System) that is basic software controlling the entirety of the computer 500, application software operating together with the OS to provide various functions, and so forth. Note that it is also possible that the computer 500 uses, instead of the HDD 508, another type of a drive device (for example, a solid state drive (SSD)) that uses a flash memory as a recording medium.

The external I/F 503 connects the computer 500 to an external device. The external device may be, for example, a recording medium 503*a*. By using the external I/F 503, the computer 500 reads information from and writes information to the recording medium 503*a*. The recording medium 503*a* may be a flexible disk, a CD (Compact Disc), a DVD (Digital Versatile Disc), an SD (Secure Digital) memory card, a USB (Universal Serial Bus) memory, or the like.

The ROM 505 is a semiconductor memory (a storage device) that holds programs and data even after the power supply has been turned off. The ROM 505 stores various programs and data such as a BIOS (Basic Input/Output System) executed when the computer 500 is started, OS settings, network settings, and so forth. The RAM 504 is one example of a volatile semiconductor memory (a storage device) temporarily storing programs and data.

The CPU 506 reads programs or data from a storage device such as the ROM 505 or the HDD 508 in the RAM 504 and carries out processes to implement control of the entirety of the computer 500 and to implement various functions.

Each of the client terminal 12, the client terminal 70, the counter storage server apparatus 20, the analysis data storage server apparatus 30, the information management server apparatus 35, and the web server apparatus 40 has a hardware configuration such as that, for example, the hardware configuration of the computer 500 illustrated in FIG. 2, to implement various processes such as those that will be described later.

《 Output Apparatus 》

Figure 3:
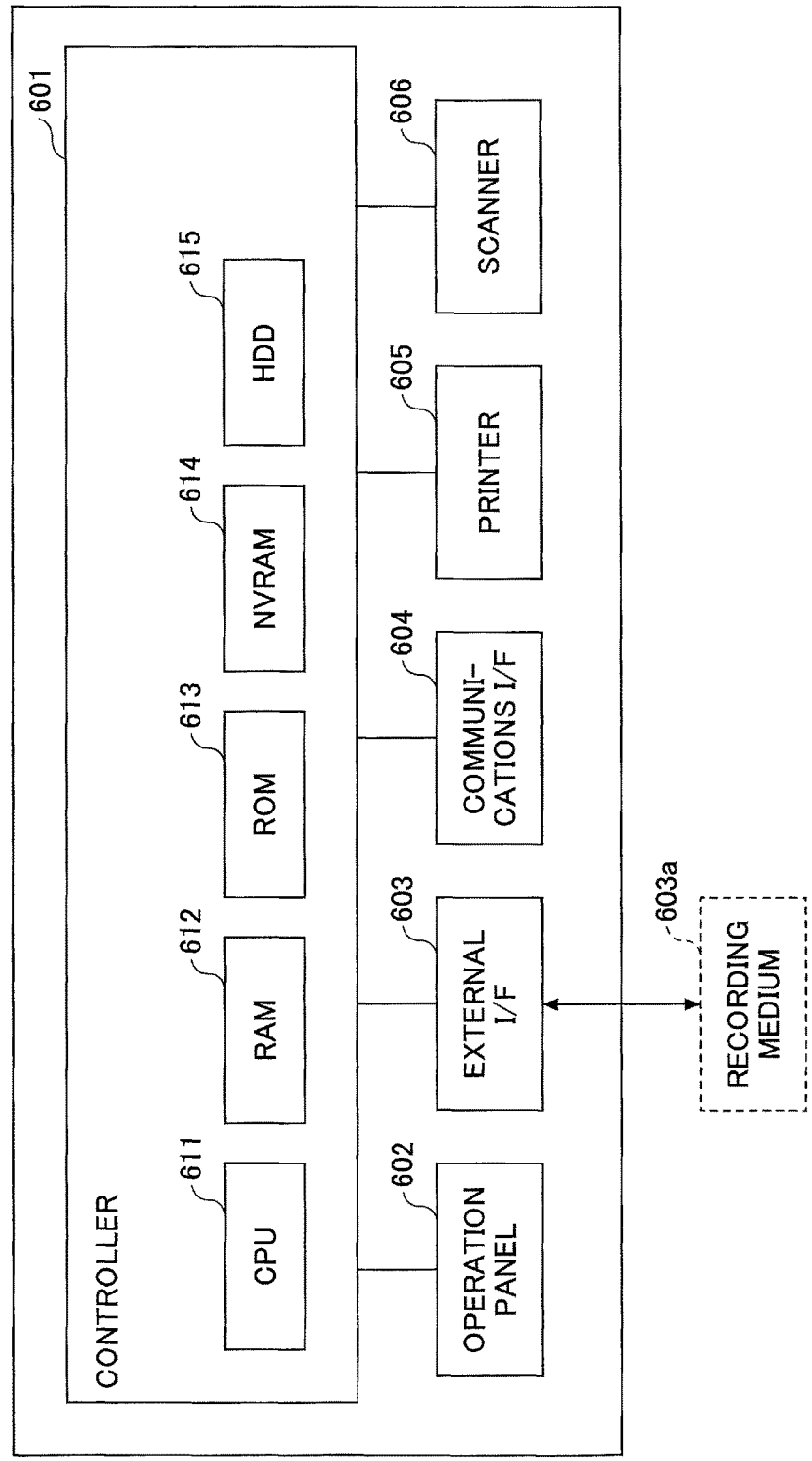
FIG. 3 illustrates a hardware configuration of one example of each of output apparatuses.

Each of the output apparatuses 10 of FIG. 1 is implemented by, for example, a computer having a hardware configuration of FIG. 3 if the output apparatus 10 is a multifunction peripheral. FIG. 3 illustrates a hardware configuration of one example of each of the output apparatuses 10. The output apparatus 10 illustrated in FIG. 3 includes, for example, a controller 601, an operation panel 602, an external I/F 603, a communications I/F 604, a printer 605, and a scanner 606.

The controller 601 includes, for example, a CPU 611, a RAM 612, a ROM 613, a NVRAM (NonVolatile Random Access Memory) 614, and a HDD 615. The ROM 613 stores various programs and data. The RAM 612 temporarily stores programs and data. The NVRAM 614 stores, for example, setting information, and so forth. The HDD 615 stores various programs and data.

The CPU 611 reads programs, data, setting information, and so forth from the ROM 613, the NVRAM 614, or the HDD 615, writes the read programs, data, information, and so forth in the RAM 612, and carries out processes to implement control of the entirety of the output apparatus 10 and to implement various functions.

The operation panel 602 includes an input unit that receives an input from a user and a display unit displaying data or information to the user. The external I/F 603 connects the output apparatus 10 to an external device. The external device may be a recording medium 603*a*, for example. By using the external I/F 603, the output apparatus 10 reads information from and writes information to the recording medium 603*a*. The recording medium 603*a* may be an IC (Integrated Circuit) card, a flexible disk, a CD, a DVD, a SD memory card, a USB memory, a SIM (Subscriber Identity Module) card, or the like.

The communications I/F 604 connects the output apparatus 10 to the network 60. By using the communications I/F 604, the output apparatus 10 carries out data communications. The printer 605 prints print data onto a to-be-conveyed object. The to-be-conveyed object is, for example, paper, coated paper, a pasteboard, a viewgraph, a plastic film, a prepreg, a copper foil, or the like, and thus, is not limited to paper. The scanner 606 is a reading device that reads image data (electronic data) from an original sheet. As mentioned above, FIG. 3 illustrates an example in a case where the output apparatus 10 is a multifunction peripheral. If the output apparatus 10 is not a multifunction peripheral, the output apparatus 10 need not have the printer 605 and the scanner 606. Also, the output apparatus 10 can have hardware elements not illustrated in FIG. 3 such as a camera, a lamp light source, a touch panel, and so forth.

<Software Configuration>

《 Information Management Server Apparatus 》

Figure 4:
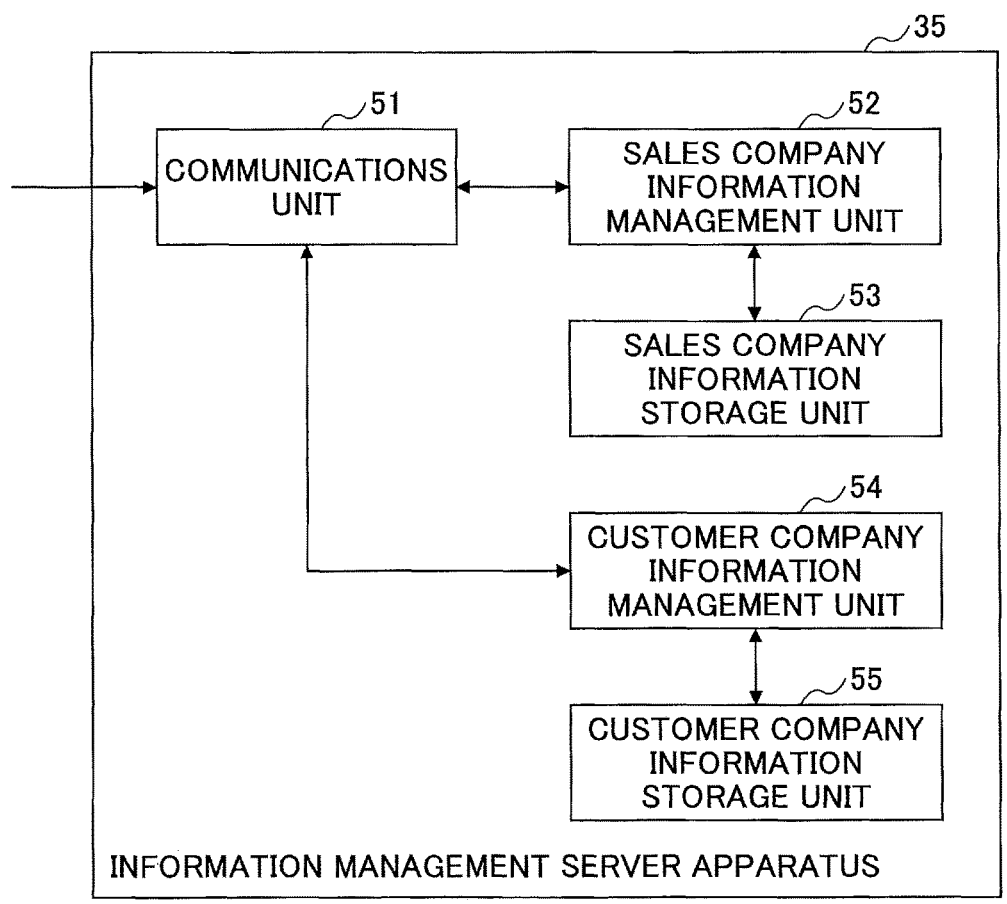
FIG. 4 is a process block diagram illustrating one example of an information management server apparatus according to the present embodiment.

The information management server apparatus 35 according to the present embodiment is implemented by, for example, process blocks illustrated in FIG. 4. FIG. 4 is a process block diagram illustrating one example of the information management server apparatus 35 according to the present embodiment. The information management server apparatus 35 executes a program to implement the process blocks illustrated in FIG. 4.

The information management server apparatus 35 of FIG. 4 implements a communications unit 51, a sales company information management unit 52, a sales company information storage unit 53, a customer company information management unit 54, and a customer company information storage unit 55. The communications unit 51 carries out data communications with an external apparatus. The sales company information storage unit 53 stores the sales company information. The sales company information management unit 52 manages the sales company information stored by the sales company information storage unit 53. The sales company information management unit 52 provides the sales company information to the web server apparatus 40 by transmitting the sales company information stored by the sales company information storage unit 53 to the web server apparatus 40 through the communications unit 51 in response to receiving a request from the web server apparatus 40 through the communications unit 51.

The customer company information storage unit 55 stores the customer company information. The customer company information management unit 54 manages the customer company information stored by the customer company information storage unit 55. The customer company information management unit 54 provides the customer company information to the web server apparatus 40 by transmitting the customer company information stored by the customer company information storage unit 55 to the web server apparatus 40 through the communications unit 51 in response to receiving a request from the web server apparatus 40 through the communications unit 51.

FIGS. 5A and 5B illustrate examples of the sales company information and the customer company information, respectively, managed by the information management server apparatus 35. FIG. 5A illustrate one example of a sales company table that stores the sales company information. FIG. 5B illustrates one example of a customer company table that stores the customer company information.

The sales company table of FIG. 5A stores lists of customer companies associated with sales companies, respectively, as the sales company information. For example, in the sales company table of FIG. 5A, sales company names are associated with the lists of customer companies, respectively.

In the customer company table of FIG. 5B, available types of reports (i.e., AVAILABLE REPORTS), reference dates used when monthly data is created (i.e., monthly data creation reference dates), and lists of apparatuses (i.e., apparatus lists) for which reports are created are stored for each company as the customer company information. For example, in the customer company table of FIG. 5B, the customer company names are associated with the available reports, the monthly data creation reference dates, and the apparatus lists. The customer company name is one example of identification information of each of the customer companies. However, identification information of each customer company is not limited to a company name, and, instead, identification information of each customer company may be expressed by a numeral, a symbol, a figure, or a combination of at least any two of a numeral, a symbol, and a figure.

《Web Server Apparatus》

Figure 6:
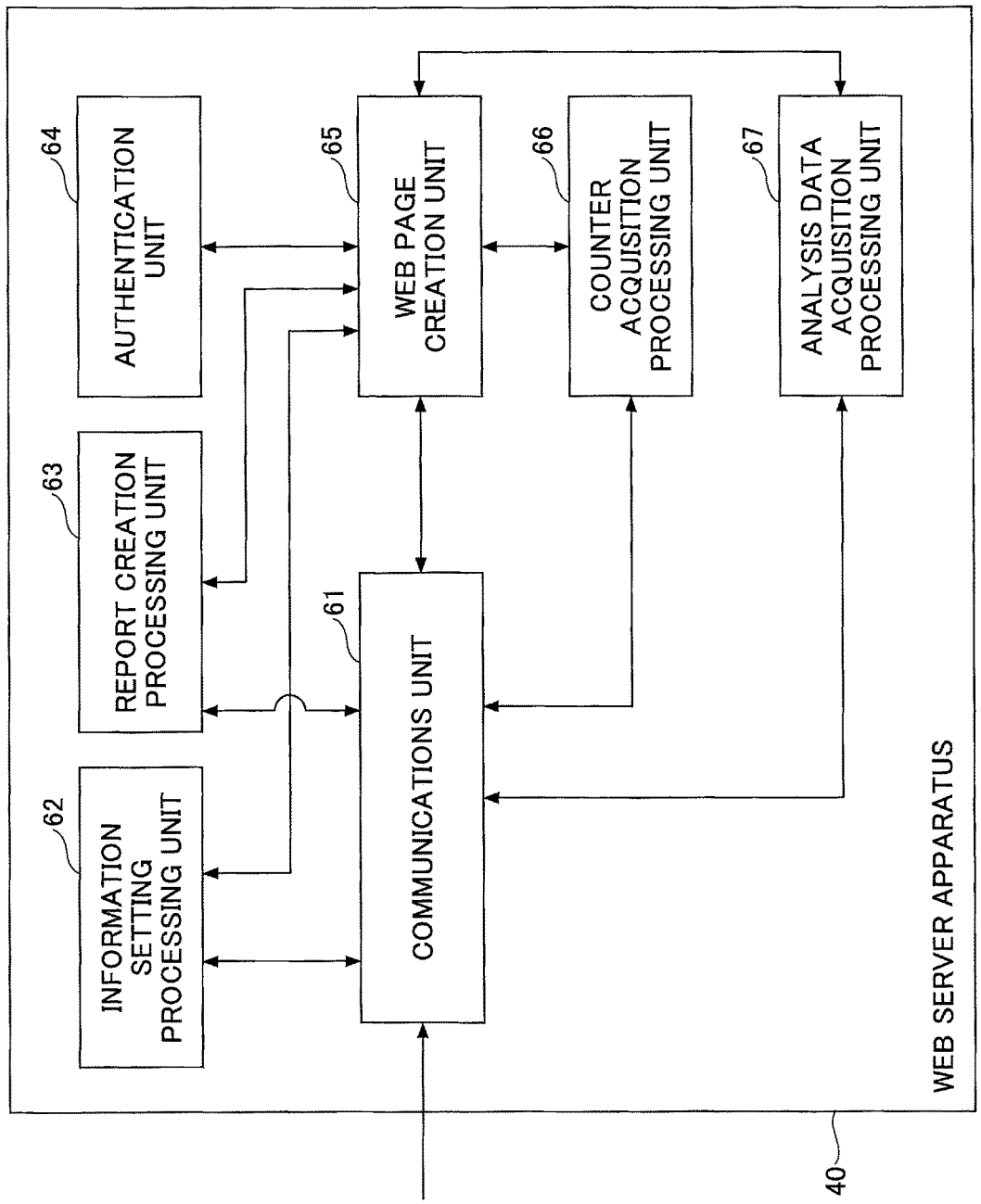
FIG. 6 illustrates one example of process blocks of a web server apparatus according to the present embodiment.

The web server apparatus 40 according to the present embodiment is implemented by, for example, process blocks illustrated in FIG. 6. FIG. 6 illustrates one example of process blocks of the web server apparatus according to the present embodiment. The web server apparatus 40 implements the process blocks illustrated in FIG. 6 by executing a program. The web server apparatus 40 implements a communications unit 61, an information setting process unit 62, a report creation process unit 63, an authentication unit 64, a web page creation unit 65, a counter acquisition process unit 66, and an analysis data acquisition process unit 67.

The communications unit 61 carries out data communications with an external apparatus. The information setting process unit 62 responds to an instruction from the client terminal 12 or the client terminal 70, to set the sales company information and the customer company information to the information management server apparatus 35. The report creation process unit 63 creates a report as will be described. The authentication unit 64 authenticates a user who operates the client terminal 12 or the client terminal 70. Authentication of a user by the authentication unit 64 is carried out in such a manner that, for example, it is determined whether authentication information (for example, a combination of a user ID and a password) received by the communications unit 61 is the same as authentication information previously registered in the web server apparatus 40.

However, authentication of a user by the authentication unit 64 may be carried out in another method. Note that user's authentication information used by the authentication unit 64 previously registered may be registered in a database that is placed outside the web server apparatus 40 instead of the web server apparatus 40. Also authentication information of an administrator user that will be described later is registered in the same method.

The web server apparatus 40 stores authentication information of a user who has administrator authority, authentication information of a user who has user authority, and identification information of a customer company associated with a user ID of a user who has user authority. Note that, authentication information of a user is a user ID and a password. Identification information of a customer company is used to determine which customer company a user belongs to. It is also possible that the authentication information of a user who has administrator authority, the authentication information of a user who has user authority, and the identification information of a customer company associated with a user ID of a user who has user authority are registered in a database outside the Web server apparatus 40.

The web page creation unit 65 creates a web page on the basis of a request that is sent from the client terminal 12 or the client terminal 70 and is received by the communications unit 61, and transmits the web page through the communications unit 61, to cause the web browser that is installed in the client terminal 12 or the client terminal 70 to display the web page.

If the web page creation unit 65 uses daily data or monthly data of an output apparatus 10 for creating a web page, the web page creation unit 65 requests the daily data or the monthly data of the output apparatus 10 from the counter acquisition process unit 66 or from the analysis data acquisition process unit 67 to acquire the daily data or the monthly data of the output apparatus 10. If the web page creation unit 65 uses a report for creating a web page, the web page creation unit 65 requests the report creation process unit 63 to create the report.

The counter acquisition process unit 66 acquires daily data of an output apparatus 10 requested by the web page creation unit 65 by receiving the daily data of the output apparatus 10 from the counter storage server apparatus 20 though the communications unit 61, to provide the daily data of the output apparatus 10 to the web page creation unit 65. The analysis data acquisition process unit 67 acquires monthly data of an output apparatus 10 requested by the web page creation unit 65 by receiving the monthly data of the output apparatus 10 from the analysis data storage server apparatus 30 through the communications unit 61, to provide the monthly data of the output apparatus 10 to the web page creation unit 65.

<Process>

《Information Setting Process》

Figure 7:
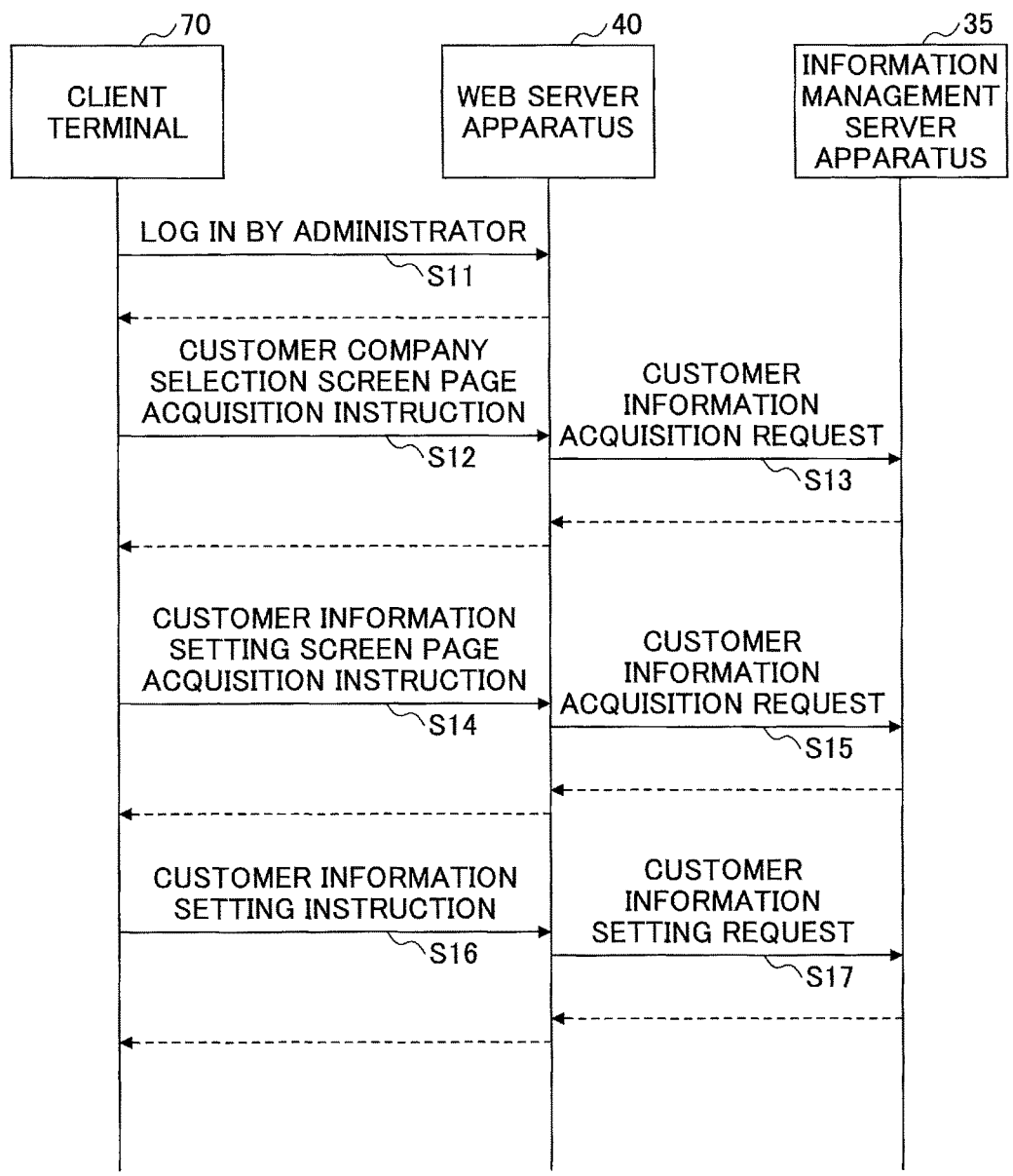
FIG. 7 is a sequence diagram illustrating one example of a customer information setting process.

The information processing system 1 according to the present embodiment sets the customer company information through, for example, a procedure illustrated in FIG. 7. FIG. 7 is a sequence diagram illustrating one example of a customer information setting process. For example, an administrator user of a sales company requests the web server apparatus 40 through the client terminal 70 to log in to the web server apparatus 40 with administrator authority in step S11. In response to the log-in request with the administrator authority, the authentication unit 64 tries to authenticate the administrator user on the basis of authentication information transmitted from the client terminal 70 as described above.

If the authentication is successful, the process proceeds to step S12, and the client terminal 70 transmits a customer company selection screen page acquisition instruction to the web server apparatus 40. In response to the communications unit 61 receiving the customer company selection screen page acquisition instruction, the process proceeds to step S13. In step S13, the web server apparatus 40 transmits a customer information acquisition request to the information management server apparatus 35 through the communications unit 61. In response, the web server apparatus 40 receives and acquires the sales company information of FIG. 5A and the customer company information of FIG. 5B from the information management server apparatus 35 through the communications unit 61.

The web server apparatus 40 then generates a customer company selection screen page 1000 of FIG. 8 that includes a customer company list and information indicating sales companies associated with the customer companies, on the basis of the acquired sales company information of FIG. 5A and the acquired customer company information of FIG. 5B. The web server apparatus 40 then transmits the thus generated customer company selection screen page 1000 through the communications unit 61, to display the customer company selection screen page 1000 on the display screen of the client terminal 70.

FIG. 8 illustrates one example of the customer company selection screen page 1000. The customer company selection screen page 1000 of FIG. 8 has a report setting button 1001 for each customer company. The administrator user selects a customer company for which the administrator user will set customer company information, by pressing the corresponding report setting button 1001 in the customer company selection screen page 1000.

In response to receiving the selection of the customer company by the administrator user, the process proceeds to step S14, and the client terminal 70 transmits a customer information setting screen page acquisition instruction for the selected customer company to the web server apparatus 40. The customer information setting screen page acquisition instruction includes identification information (for example, a company name described in FIG. 5B) of the selected customer company.

Then, the process proceeds to step S15, and, in response to receiving the customer information setting screen page acquisition instruction through the communications unit 61, the web server apparatus 40 transmits a customer information acquisition request for the record of the customer information corresponding to the identification information of the selected customer company to the information management server apparatus 35 through the communications unit 61, to receive and acquire the corresponding record of the sales company information of FIG. 5A and the corresponding record of the customer company information of FIG. 5B from the information management server apparatus 35 through the communications unit 61.

The corresponding record of the customer company information of FIG. 5B thus received from the information management server apparatus 35 includes the available types of reports, the monthly data creation reference date, and the apparatus list of the apparatuses for which a report will be created corresponding to the identification information (in this example, the company name) of the selected customer company.

The web server apparatus 40 uses the acquired record of the sales company information of FIG. 5A and the acquired record of the customer company information of FIG. 5B, to generate a customer information setting screen page 1100 of FIG. 9 for the customer company selected by the administrator user, and displays the generated customer information setting screen page 1100 on the display screen of the client terminal 70 by transmitting the customer information setting screen page 1100 through the communications unit 61.

FIG. 9 illustrates one example of the customer information setting screen page 1100. The customer information setting screen page 1100 of FIG. 9 is one example of a screen page to receive, from the administrator user, settings of types of reports available to the customer company ("Available Reports"), an export available to the costumer company ("Available Export"), and a monthly data creation reference date for the customer company as customer company information. The administrator user sets customer company information that includes types of reports available to the customer company, an export available to the costumer company, and a monthly data creation reference date for the customer company in the displayed customer information setting screen page 1100.

Thereafter, by pressing a "Store" button 1101, the administrator user inputs an instruction to the client terminal 70 to set the customer company information that includes the types of reports available to the customer company, the export available to the costumer company, and the monthly data creation reference date for the customer company to the customer company information storage unit 55 of the information management server apparatus 35. Through such a setting operation, the administrator user can set types of reports available to each customer company from among the plurality of types of reports that can be provided by the web service provision environment.

Returning to FIG. 7, in response to the above-mentioned instruction having been input by the administrator user to set the customer company information that includes the available types of reports, the available export, and the monthly data creation reference date for the selected customer company to the customer company information storage unit 55, the process proceeds to step S16.

In step S16, the client terminal 70 transmits a customer information setting instruction to the web server apparatus 40, to reflect the customer company information that includes the available types of reports, the available export, and the monthly data creation reference date having been thus set by the administrator user in the customer information setting screen page 1100, in the customer company information stored in the customer company information storage unit 55 of the information management server apparatus 35.

Then, the process proceeds to step S17, and the web server apparatus 40 transmits a customer information setting request to the information management server apparatus 35 through the communications unit 61, to reflect the customer company information that includes the available types of reports, the available export, and the monthly data creation reference date having been thus set by the administrator user in the customer information setting screen page 1100, in the customer company information stored in the customer company information storage unit 55 managed by the information management server apparatus 35. Thus, the customer company information stored in the customer company information storage unit 55 is updated to reflect the settings having been input by the administrator user.

According to the customer information setting process of FIG. 7, an administrator user of sales company, for example, can change the customer company information managed by the information management server apparatus 35 through the client terminal 70, and thus, the administrator user can set types of reports available to each customer.

《Report Creation Process》

The information processing system 1 according to the present embodiment creates a report through, for example, a procedure illustrated in FIG. 10. FIG. 10 is a sequence diagram illustrating a report creation process. For example, a user in a customer company logs in to the web server apparatus 40 with user authority in step S21 from the client terminal 12. In response to the log-in operation made by the user authority, the authentication unit 64 tries to authenticate the user on the basis of authentication information transmitted from the client terminal 12 as described above. If the authentication is successful, a portal screen page 1200 (described later with reference to FIG. 11) transmitted from the web server apparatus 40 is displayed on the display screen of the client terminal 12.

In response to a "Report" button 1201 being pressed by the user in the portal screen page 1200, the process proceeds to step S22, and the client terminal 12 transmits a report selection screen page acquisition instruction. Then, the process proceeds to step S23, and the web server apparatus 40 transmits a customer information acquisition request for the record of the customer company information corresponding to the user ID of the user who has logged in, to the information management server apparatus 35 through the communications unit 61, to acquire the record of the customer company information. For example, if the company name of the customer company corresponding to the user ID of the user who has logged in is "AA", the web server apparatus 40 receives the record of the customer company information associated with the customer company name "AA" in FIG. 5B from the information management server apparatus 35 through the communications unit 61. The web server apparatus 40 then extracts the information indicating the available types of reports (AVAILABLE REPORT) corresponding to the user who has logged in from the received record of the customer company information.

Figure 11:
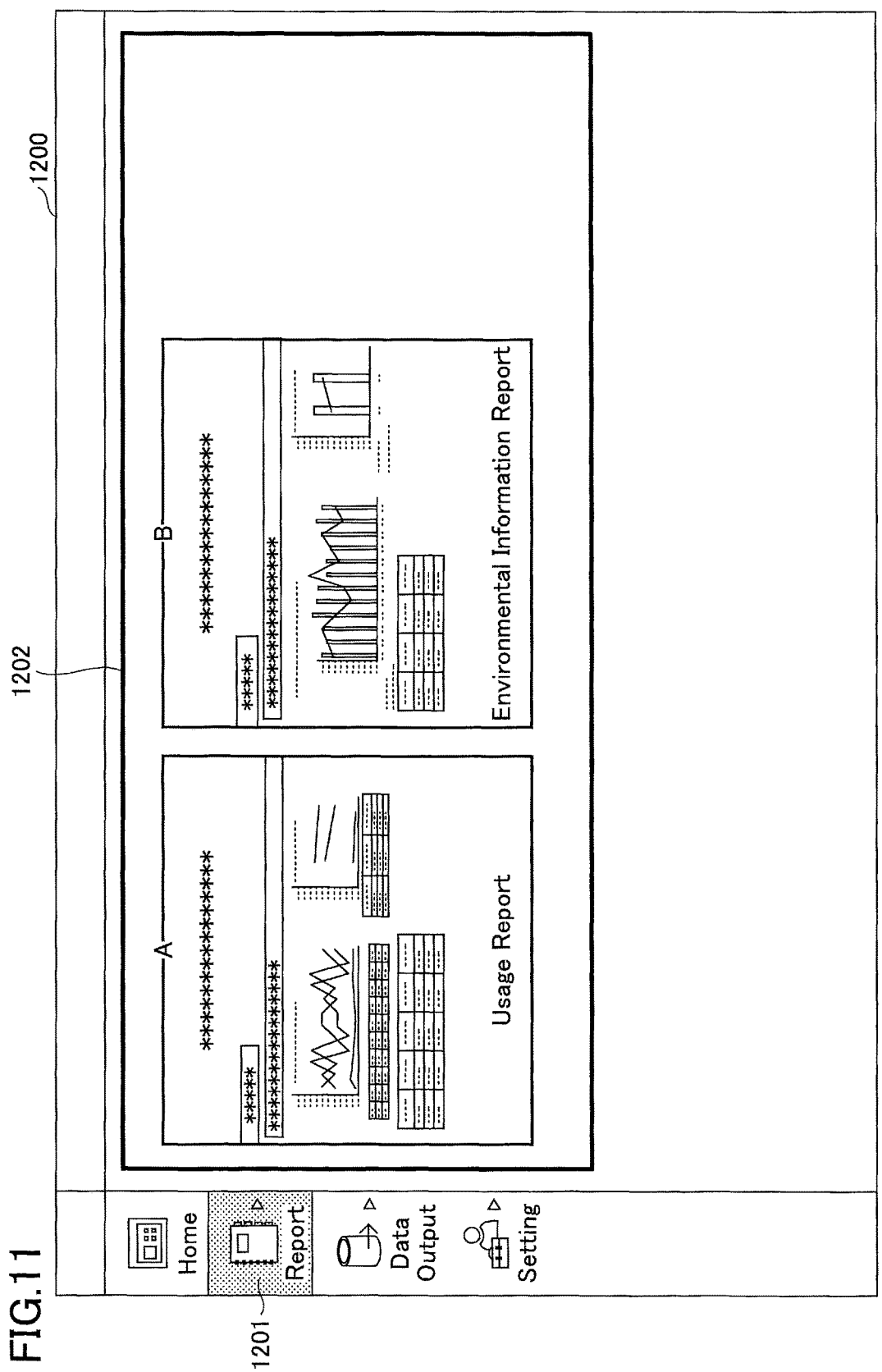
FIG. 11 illustrates one example of a report selection screen page.

Then, on the basis of the thus extracted information, the web server apparatus 40 creates a report selection screen page 1202 of FIG. 11 using the web page creation unit 65, in which one type is selected from among the available types of reports corresponding to the user who has logged in, and transmits the created web page to the client terminal 12 through the communications unit 61, to display the report selection screen page 1202 in the portal screen page 1200 displayed on the client terminal 12. FIG. 11 illustrates one example of the report selection screen page 1202.

The user selects a type of a report to be created from among the available types of reports in the report selection screen page 1202. In the example of FIG. 11, the user can select one of a "usage report" and an "environment information report" in the report selection screen page 1202.

The process then proceeds to step S24, and the client terminal 12 transmits a report creation screen page acquisition instruction to acquire a report creation screen page 1300 (described later with reference to FIGS. 12A and 12B) corresponding to the selected type of a report to the web server apparatus 40.

Then, the process proceeds to step S25, and the web server apparatus 40 receives and acquires the record of the customer company information corresponding to the user ID of the user who has logged in from the information management server apparatus 35 through the communications unit 61. For example, if the company name of the customer company corresponding to the user ID of the user who has logged in is "AA", the web server apparatus 40 receives the record of the customer company information associated with the customer company name "AA" in FIG. 5B from the information management server apparatus 35 through the communications unit 61.

Also, in step S26, the web server apparatus 40 requests daily data concerning the apparatuses associated with the company name of the customer company of the user who has logged in according to the received record of the customer company information (in particular, APPARATUS LIST) illustrated in FIG. 5B as operation information concerning the customer company of the user who has logged in, from the counter storage server apparatus 20 through the communications unit 61, to acquire the daily data from the counter storage server apparatus 20.

Further, in step S27, the web server apparatus 40 requests monthly data concerning the apparatuses associated with the customer company of the user who has logged in according to the received record of the customer company information (in particular, APPARATUS LIST) illustrated in FIG. 5B also as operation information concerning the customer company of the user who has logged in, from the analysis data storage server apparatus 30 through the communications unit 61, to acquire the monthly data from the analysis data storage server apparatus 30.

Figure 12B:
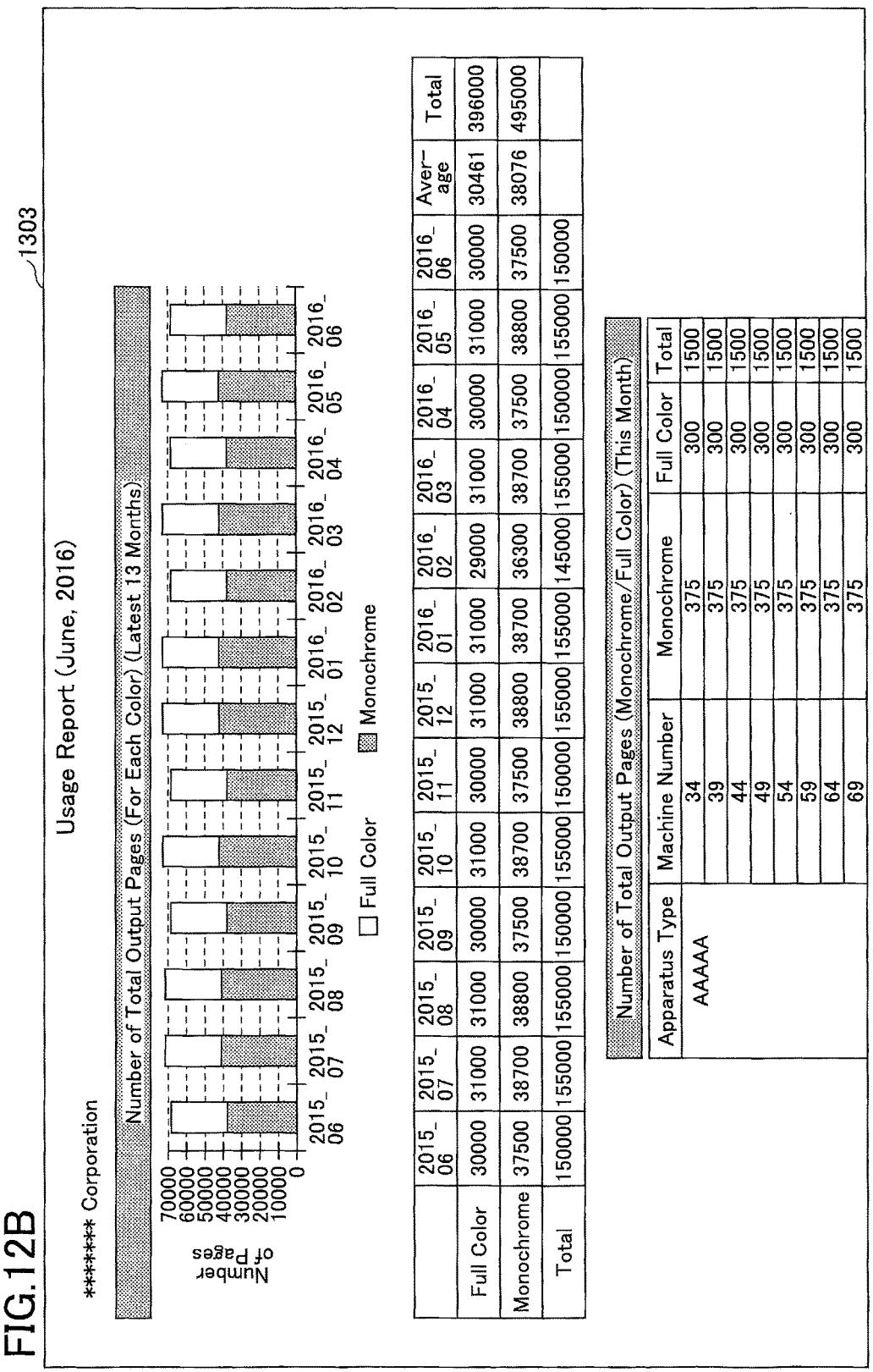

The web server apparatus 40 creates the report creation screen page 1300 such as that illustrated in FIGS. 12A and 12B, in which the operation information is expressed as a graph and tables on the basis of the received record of the customer company information and the acquired operation information, and displays the created report creation screen page on the client terminal 12.

FIGS. 12A and 12B illustrate one example of the report creation screen page 1300. In the report creation screen page 1300 of FIGS. 12A and 12B, the operation information concerning the apparatuses (i.e., the output apparatuses 10) associated with the customer company according to the received record of the customer company information illustrated in FIG. 5B is displayed in a form of a graph and tables. In the report creation screen page 1300 of FIGS. 12A and 12B, a report output button 1301 for a user to input a report output instruction is included as illustrated in FIG. 12A.

In response to the report output button 1301 being pressed, the process proceeds to step S28, and the client terminal 12 transmits the corresponding report output instruction to the web server apparatus 40. In response to receiving the report output instruction through the communications unit 61, the web server apparatus 40 outputs the report displayed in the report creation screen page 1300 by printing the report using a certain printing apparatus by sending the corresponding printing instruction to the printing apparatus, or downloads the corresponding report data in a form of a file having a certain format to the client terminal 12.

According to the report creation process of FIG. 10, a user belonging to a customer company, for example, selects a type of a report to be displayed from among available types of reports, and displays the selected type of report on the client terminal 12.

Figure 13:
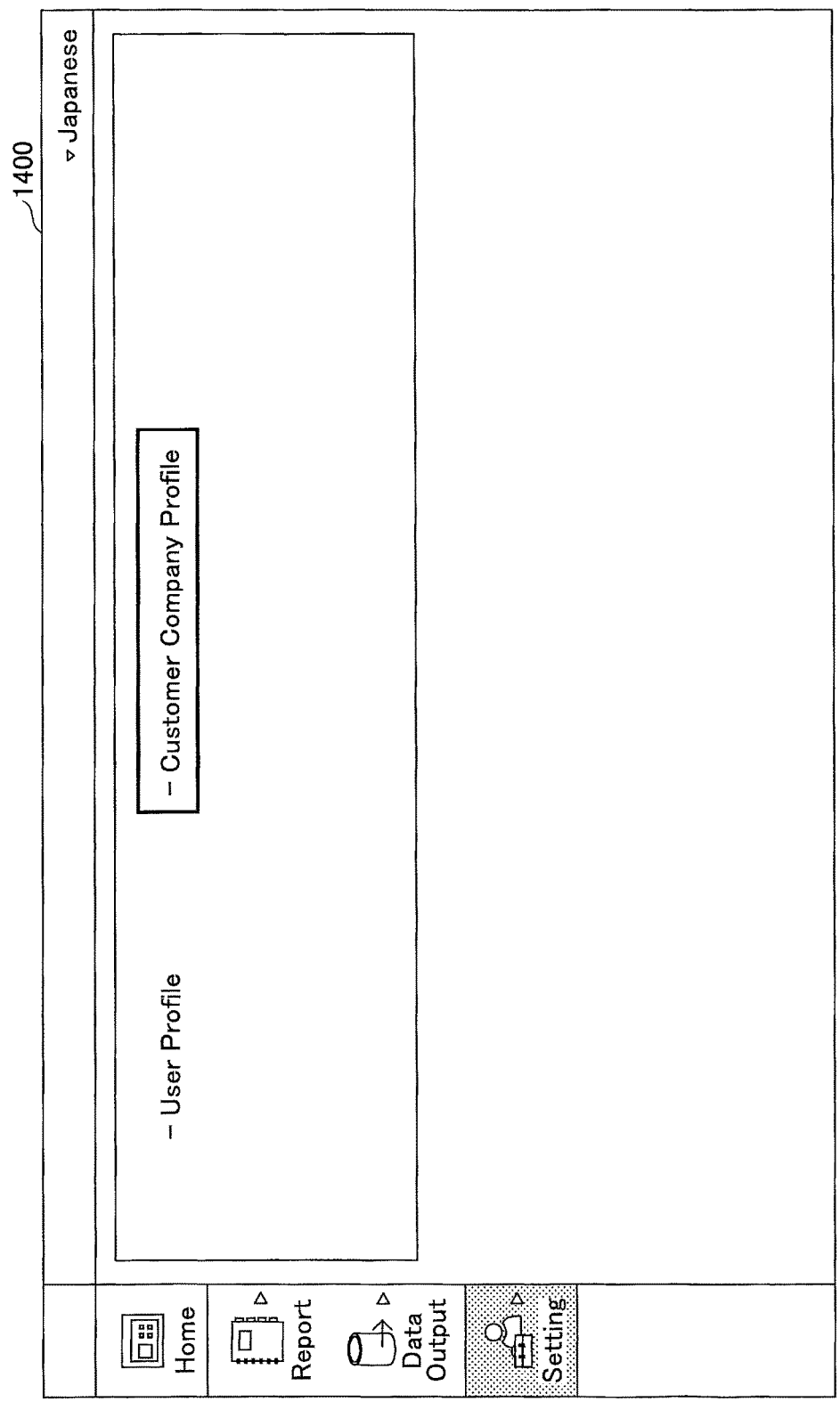
FIG. 13 illustrates one example of a setting profile selection screen page.

In this regard, in response to, for example, a user in a customer company pressing a setting button 1302 in the report creation screen page 1300 illustrated in FIG. 12A, a request for a setting profile selection screen page 1400 of FIG. 13 is transmitted to the web server apparatus 40 so that the setting profile selection screen page 1400 is displayed on the client terminal 12. FIG. 13 illustrates one example of the setting profile selection screen page. The user in the customer company causes a user profile setting screen page or a customer company profile setting screen page to be displayed by selecting a "User Profile" or a "Customer Company Profile" in the setting profile selection screen page 1400 of FIG. 13.

FIG. 14 illustrates one example of the customer company profile setting screen page. The customer company profile setting screen page 1500 illustrated in FIG. 14 is one example of a screen page from which a user sets a customer company name, a business type, a customer company logo, organization information, and a monthly data creation reference date. It is also possible that the customer company profile setting screen page 1500 has a function for a user to set a carbon dioxide ($CO_2$) emission factor for the customer company. The business type is expressed by information identifying, for example, a business type such as distribution industry, retail industry, medical industry, education industry, or the like. In response to any of the setting items being pressed by a user in the customer company profile setting screen page 1500, and then, a "Store" button being pressed by the user in the customer company profile setting screen page 1500, the contents that the user has thus set are transmitted to the web server apparatus 40, and the web server apparatus 40 updates the customer company information accordingly on the basis of the contents that the user has set and has been received through the communications unit 61.

According to the present embodiment, available types of reports are set for each customer company. However, an embodiment is not limited to this method. For example, it is also possible that available types of reports are set for each sales company, or available types of reports are set for each business type of customer companies. It is also possible that available types of reports are set for each combination of a customer company, a sales company and a business type. Such settings may be implemented as a result of, for example, an item of available types of reports being added to the sales company table of FIG. 5A in such a manner that available types of reports are associated with each sales company as illustrated in FIG. 15A; an item of identification information of a business type being added to the customer company table of FIG. 5B in such a manner that identification information of a business type is associated with each customer company as illustrated in FIG. 15B; another correspondence table being created; or the like.

In the example of the customer information setting screen page 1100 of FIG. 9, there are two available types of reports. However, if the number of available types of reports increases, it may become difficult to find out a desired type of a report from among many types of reports.

In consideration of this point, the following method may be used. First, by using tables of FIGS. 5A and 5B, and so forth, business types corresponding to customer companies or sales companies corresponding to customer companies are displayed on the display screen of the client terminal 70 as selection candidates. Then, an administrator user selects a desired business type or a desired sales company from among the displayed candidates. As a result, the web server apparatus 40 determines types of reports associated with the selected business type or the selected sales company, and displays the determined types of reports in the customer information setting screen page 1100 of the client terminal 70. Thus, it is possible to effectively reduce the number of types of reports to be displayed in the customer information setting screen page 1100, and a user can easily select a desired types of reports from among the displayed reduced number of types of reports.

Second Embodiment

According to the first embodiment described above, in the information processing system 1 of FIG. 1, the counter storage server apparatus 20, the analysis data storage server apparatus 30, the information management server apparatus 35, and the web server apparatus 40 are connected to the network 50 outside the customer environment. In other words, the information processing system 1 illustrated in FIG. 1 is an example where the counter storage server apparatus 20, the analysis data storage server apparatus 30, the information management server apparatus 35, and the web server apparatus 40 are included in a so-called cloud environment.

According to a second embodiment, the counter storage server apparatus 20, the analysis data storage server apparatus 30, the information management server apparatus 35, and the web server apparatus 40 are included in the customer environment (i.e., an on-premises environment). The hardware configuration, the software configuration, and the processes of the information processing system 1 according to the second embodiment can be the same as those of the information processing system 1 of FIG. 1, and therefore, duplicate description will be omitted.

[Variants]

In the above-described information processing system according to the first or second embodiment, it is also possible to set "creation authority" such that a sales company specifies types of reports for a customer company. For example, in the above-described information processing system according to the first or second embodiment, it is also possible that "pay types of reports" and "free types of reports" are set, and, on the basis of billing information indicating that a customer company has made a billing contract for pay types of reports or a customer company has made a payment for pay types of reports, creation authority is set for the pay types of reports for the customer company. Then, which available types of reports will be displayed in the customer information setting screen page 1100 of FIG. 9 from among which available types of reports will be selected to be set for a customer company may be controlled on the basis of such creation authority.

Also, in the above-described information processing system according to the first or second embodiment, it is also possible to prepare a type of a report considering differences in power consumption among countries. Further, it is also possible to prepare a type of a report depending on a business type or a business model of a customer company. Thus, according to the information processing systems 1 of the embodiments, it is possible for a sales company to set types of reports available to a customer company, and thus, it is possible to prepare types of reports for each customer company.

The information processing systems and the report creation methods have been described in the embodiments. However, embodiments are not limited to the above-described embodiments, and various modifications and replacements may be made. For example, operation history information may be information also other than a counter value. Operation history information may be also a time for which an output apparatus 10 has been being used; an image data amount or the number of sheets of images that an output apparatus 10 has photographed; a communications data amount of an output apparatus 10; a time for which an output apparatus 10 has been outputting data; an amount of data that an output apparatus 10 has output; or the like.

Note that, the system configurations of the information processing systems 1 according to the embodiments are examples, and other various system configurations may be used instead depending on particular uses or purposes. The web service provision environment is one example of an "information processing system for providing a report concerning an operation history of an output apparatus to a customer who uses the output apparatus".

According to the embodiments, it is possible to set types of reports available to each customer.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. For example, the CPU may be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing system for providing a report concerning an operation history of an output apparatus to a customer who uses the output apparatus, the output apparatus including at least an image forming apparatus, the information processing system comprising one or more processors and one or more memories, the one or more processors being configured to:
   store, in the one or more memories, operation history information of each of output apparatuses;
   store, in the one or more memories, one or more types of reports available to each of customers of the output apparatuses, said output apparatus being managed so as to be associated with customer information corresponding to user ID of each of the customers of the output apparatuses, each of the one or more types of the reports including information of a category different from each other, said one or more types of reports being predetermined to be available to each of the customers that is associated to the user ID;
   perform a log-in process of the output apparatus based on the user ID;
   determine the one or more types of reports that are available to a customer of the output apparatus based on the user ID,
   display, on a terminal apparatus that is operated by the customer of the output apparatus, the one or more types of reports available to the customer of the output apparatus on the basis of the stored settings of one or more types of reports available to each of the customers of the output apparatus, to receive a selection of a type of a report from the customer of the output apparatus from among the displayed one or more types of reports; and
   generate a report of the type selected by the customer of the output apparatus based on the operation history information of the output apparatus associated with the customer information corresponding to the user ID of the user that logs in the output apparatus, to display the generated report on the terminal apparatus,
   wherein the one or more types of reports available to each of customers include pay types of reports and free types of reports, and
   wherein the one or more types of reports available to each of customers are set by service providers that provide services concerning the output apparatuses to the customers before receiving the selection of the type of the report from the customer of the output apparatus.

2. The information processing system according to claim 1, wherein
   the one or more processors are further configured to:
   manage service providers in association with the customers, the service providers providing services concerning the output apparatuses to the customers; and
   display, on a terminal apparatus that is operated by a service provider, one or more types of reports available to a customer of the output apparatus who is associated with the service provider, receive a request from the service provider to change the one or more types of reports available to the customer, and, in response to the request, change the one or more types of reports available to the customer.

3. The information processing system according to claim 2, wherein
   the one or more processors are further configured to:
   store, in the one or more memories, settings of for each of the service providers, one or more types of reports available to one or more customers; and
   with the use of the settings of, for each of the service providers, one or more types of reports available to one or more customers, receive a request from a service provider to change one or more types of reports available to one or more customers.

4. The information processing system according to claim 2, wherein
   the one or more processors are further configured to:
   store, in the one or more memories, for each of business types of the customers, one or more types of reports available to one or more customers, and
   with the use of the settings of, for each of the business types of the customers, one or more types of reports available to one or more customers, receive a request from a service provider to change one or more types of reports available to one or more customers.

5. The information processing system according to claim 1, wherein
the one or more processors are further configured to:
in response to a selection of a report concerning environmental information as a type of a report by a customer, generate the report concerning environmental information with the use of a carbon dioxide emission factor corresponding to the customer, and display the report concerning environmental information on the terminal apparatus operated by the customer.

6. The information processing system according to claim 2, wherein
the one or more processors are further configured to:
in response to a selection of a report concerning environmental information as a type of a report by a customer, generate the report concerning environmental information with the use of a carbon dioxide emission factor corresponding to the customer, and display the report concerning environmental information on the terminal apparatus operated by the customer.

7. The information processing system according to claim 3, wherein
the one or more processors are further configured to:
in response to a selection of a report concerning environmental information as a type of a report by a customer, generate the report concerning environmental information with the use of a carbon dioxide emission factor corresponding to the customer, and display the report concerning environmental information on the terminal apparatus operated by the customer.

8. The information processing system according to claim 4, wherein
the one or more processors are further configured to:
in response to a selection of a report concerning environmental information as a type of a report by a customer, generate the report concerning environmental information with the use of a carbon dioxide emission factor corresponding to the customer, and display the report concerning environmental information on the terminal apparatus operated by the customer.

9. The information processing system according to claim 1, wherein categories of information that are included in the one or more types of reports include usage status and environment information.

10. The information processing system according to claim 1, wherein the one or more types of reports are predetermined to be available to each of the customers regardless of a usage of the output apparatus.

11. A report creation method for providing a report concerning an operation history of an output apparatus to a customer who uses the output apparatus, the output apparatus including at least an image forming apparatus, the report creation method being implemented by one or more processors using one or more memories, the report creation method comprising:
storing, in the one or more memories, operation history information of each of output apparatuses;
storing, in the one or more memories, one or more types of reports available to each of customers of the output apparatuses, said output apparatus being managed so as to be associated with customer information corresponding to user ID of each of the customers of the output apparatuses, each of the one or more types of the reports including information of a category different from each other, said one or more types of reports being predetermined to be available to each of the customers that is associated to the user ID;
performing a log-in process of the output apparatus based on the user ID;
determining the one or more types of reports that are available to a customer of the output apparatus based on the user ID;
displaying, on a terminal apparatus that is operated by the customer of the output apparatus, the one or more types of reports available to the customer of the output apparatus on the basis of the stored settings of one or more types of reports available to each of the customers of the output apparatus, to receive a selection of a type of a report from the customer of the output apparatus from among the displayed one or more types of reports; and
generating a report of the type selected by the customer of the output apparatus based on the operation history information of the output apparatus associated with the customer information corresponding to the user ID of the user that logs in the output apparatus, to display the generated report on the terminal apparatus,
wherein the one or more types of reports available to each of customers include pay types of reports and free types of reports, and
wherein the one or more types of reports available to each of customers are set by service providers that provide services concerning the output apparatuses to the customers before receiving the selection of the type of the report from the customer of the output apparatus.

12. The report creation method according to claim 11, further comprising:
managing service providers in association with the customers, the service providers providing services concerning the output apparatuses to the customers; and
displaying, on a terminal apparatus that is operated by a service provider, one or more types of reports available to a customer of the output apparatus who is associated with the service provider, receiving a request from the service provider to change the one or more types of reports available to the customer, and, in response to the request, changing the one or more types of reports available to the customer.

13. The report creation method according to claim 12, further comprising:
storing, in the one or more memories, for each of the service providers, one or more types of reports available to one or more customers; and
with the use of, for each of the service providers, the one or more types of reports available to one or more customers, receiving a request from a service provider to change one or more types of reports available to one or more customers.

14. The report creation method according to claim 12, further comprising:
storing, in the one or more memories, settings of, for each of business types of the customers, one or more types of reports available to one or more customers; and
with the use of, for each of the business types of the customers, one or more types of reports available to one or more customers, receiving a request from a service provider to change one or more types of reports available to one or more customers.

15. The report creation method according to claim 11, further comprising:
in response to a selection of a report concerning environmental information as a type of a report by a customer, generating the report concerning environmental information with the use of a carbon dioxide emission factor corresponding to the customer, and displaying the report concerning environmental information on the terminal apparatus operated by the customer.

16. The report creation method according to claim 12, further comprising:

in response to a selection of a report concerning environmental information as a type of a report by a customer, generating the report concerning environmental information with the use of a carbon dioxide emission factor corresponding to the customer, and displaying the report concerning environmental information on the terminal apparatus operated by the customer.

17. The report creation method according to claim 13, further comprising:

in response to a selection of a report concerning environmental information as a type of a report by a customer, generating the report concerning environmental information with the use of a carbon dioxide emission factor corresponding to the customer, and displaying the report concerning environmental information on the terminal apparatus operated by the customer.

18. The report creation method according to claim 14, further comprising:

in response to a selection of a report concerning environmental information as a type of a report by a customer, generating the report concerning environmental information with the use of a carbon dioxide emission factor corresponding to the customer, and displaying the report concerning environmental information on the terminal apparatus operated by the customer.

* * * * *